United States Patent Office 3,387,989
Patented June 11, 1968

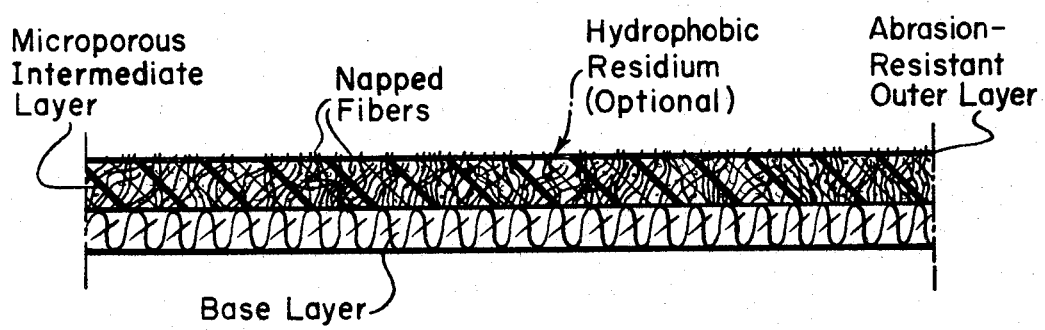

3,387,989
SIMULATED LEATHER PRODUCTS
George C. West and Charles E. Mater, Buena Vista, Va., assignors to Reeves Brothers, Inc., a corporation of New York
Continuation-in-part of application Ser. No. 331,951, Dec. 19, 1963. This application Sept. 20, 1965, Ser. No. 488,750
5 Claims. (Cl. 117—76)

This application is a continuation-in-part of our copending application Ser. No. 331,951, filed Dec. 19, 1963, and now abandoned, entitled, "Microporous Polyurethane Coatings and Films."

This invention relates to the simulation of natural leather which is achieved by coating certain types of fabrics with water vapor-permeable films of microporous polymers. The invention provides an improved simulated leather product capable of being washed or dry cleaned without marring its appearance and having the break and feel of natural leather; the invention also provides a process by which such simulated leather products may be manufactured.

Polymer systems with microporous or microporomeric structures usually exhibit permeability to moisture or water vapor, the common designation of which phenomenon is termed "breathability," while resisting the passage of water through the numerous micropores distributed throughout the polymer. Because of the breathability of these microporous polymer systems, fabrics which are coated with or laminated to films of such microporous polymer systems may be worn without the discomfort which is usually associated with water-resistant or water-repellant fabric materials which are impermeable to moisture or water vapor. Although many types of elastomers and other polymer systems have been made with microporomeric or microporous structures (the terms "microporomeric" and "microporous" being interchangeable), it is very difficult to form micropores in polyurethane polymer systems containing polyurethane resins while retaining the unique physical and chemical properties for which polyurethanes are known.

The production of normally solid, film-forming, microporous polyurethane systems is described in our copending application Ser. No. 331,951. In general, these microporous polyurethane systems are produced by uniformly dispersing throughout a polyurethane system a solid pore-forming material having an average particle size not greater than 100 mesh (Tyler standard) and then subsequently leaching the pore-former from the resultant polyurethane dispersion by a liquid which is a solvent for the pore-forming material but which does not materially affect the polymer. The particular poromeric cell formation which is achieved using this technique gives the films of these microporous polyurethane systems a very "soft" appearance and feel which is highly desirable. By way of illustration, the appearance of a thin film (ca., 0.5 to 5 mils) of these microporous polyurethane systems under magnifications of from 50× to 100× is that of tiny ellipsoidal (or egg-like) capsules with interconnecting passages. Thin films of these microporous polyurethane systems are characterized by (i) a Suter test value (as measured by ASTM D583–54–21) not less than 40 centimeters, (ii) a water vapor transmission value (as measured by ASTM E96–56T–B) not less than 30 grams per hour per square meter, and (iii) an impact spray test value (as measured by ASTM D583–54–15) not greater than 1 gram. Because of their excellent hydrostatic properties and physical appearance, these microporous polyurethane systems may be used in the production of simulated leathers.

Using microporous polyurethane systems, we have found that by coating a trimmed, napped fabric, in which the fibers forming the nap have been trimmed to a substantially uniform length, with a thin, substantially continuous film of a normally solid, microporous polyurethane system so that at least part of the napped fibers extend into and through the microporous film, and by further coating the microporous film with a very thin, substantially impervious film of a normally solid polyurethane system so that at least part of the napped fibers which extend through the microporous layer also extend into and through the outer layer, it is possible to produce a simulated leather product capable of being washed or dry cleaned without marring its appearance and having the break and feel of natural leather. Simulated leather products produced by this technique are characterized by a water vapor transmission value not greater than about 30 grams per hour per square meter.

Accordingly, the invention provides an improved simulated leather product capable of being washed or dry cleaned without marring its appearance and having the break and feel of natural leather, comprising (a) a base layer composed of a trimmed, napped fabric in which the fibers forming the nap have been trimmed to a substantially uniform length, (b) a microporous intermediate layer composed of a thin, substantially continuous film of a normally solid, microporous polyurethane system having a poromeric structure bonded to the napped surface of the base layer over substantially its entire face in such manner that at least part of the napped fibers extend into and through the microporous intermediate layer, and (c) an abrasion-resistant, outer layer composed of a very thin, substantially impervious film of a normally solid polyurethane system bonded to the intermediate layer over substantially its entire face in such manner that at least part of the napped fibers which extend through the intermediate layer also extend into and through the outer layer, the simulated leather product being characterized by a water vapor transmission value (as measured by ASTM E96–53T–B) not greater than about 30 grams per hour per square meter.

To produce the simulated leather products of the invention, a trimmed, napped fabric (such as a trimmed, napped cotton sateen) is coated with a uniformly blended mixture of polyurethane system and pore-former so that the polymer system (containing the pore-former) forms a thin film over substantially the entire face of the napped fabric. Treatment of the film-coated napped fabric with a liquid which is capable of dissolving the solid pore-forming material from the film coating but does not materially affect the polyurethane system converts the film which adheres and is probably bonded to the napped fabric into a microporous polyurethane film which forms the microporous intermediate layer (or "cushioning") layer of the product. In general, the thickness of the microporous intermediate layer will be in the range from about ¾ to about 2 ounces per yard, based on the area of the trimmed, napped fabric which form the base layer.

The microporous intermediate layer is then coated with an abrasion-resistant, outer layer composed of a very thin, substantially impervious film of a normally solid polyurethane system, preferably of the same type used to form the microporous intermediate layer. The outer layer is very thin and barely covers the microporous intermediate layer. For most types of simulated leather products, the thickness of the outer layer should average between about ¼ to about ¾ ounce per square yard, based upon the area of the napped fabric used to form the base layer. At least part of the napped fibers of the base layer should extend into and through both the intermediate and outer layers, since whatever breathability exists in the product is due to the penetration of these napped fibers through the impervious outer layer.

Alternatively, the trimmed, napped fabric may be coated with a thin film of the polyurethane system containing the pore-former and then further coated with a very thin film of the same polyurethane system without any pore-former. Upon treatment of the coated fabric with a liquid in which the pore-forming solid is soluble, the intermediate layer (containinng the pore-former) but not the outer layer is converted to a microporomeric structure. Whatever technique is used, however, the microporosity of the intermediate layer should be carefully controlled, since the leather-like appearance of the product is primarily due to the hand and feel of the microporous intermediate layer, the outer layer contributing improved abrasion resistance to the product.

Selection of a suitable polyurethane resin for use in the production of the simulated leather products of the invention may be made from those film-forming polyurethanes which are prepared from either polyesters or polyethers (or both) and which possess the requisite physical properties, such as abrasion resistance and tensile strength. By way of illustration, two elastomeric polyurethanes which have been found to be particularly satisfactory in producing the simulated leather products of the invention are the "Estane" polyurethanes manufactured by B. F. Goodrich Chemical Company and the "Texin" polyurethanes manufactured by Mobay Chemical Company.

Although these polyurethane resins are normally solid and preferably elastomeric, liquid prepolymer resins may be used in the initial stages of preparation, provided, however, that such prepolymers are capable of being cured to a normally solid, film-forming polyurethane. Moreover, the basic polymer system which is made microporomeric in the intermediate layer and remains impervious in the outer layer may contain polyurethane as the sole polymer in the system or it may contain a blended mixture of polyurethane and one or more compatible resins, such as polyvinyl chloride. To the polyurethane or polyurethane-polyvinyl chloride mixture may be added fillers, coloring material or processing aids which are the normal components of any polymer system. As used herein, the term "polyurethane system" embraces film-forming polyurethanes prepared from polyesters or polyethers (or both), as well as polymer resin mixtures which contain not less than about 30 percent by weight of such polyurethanes, together with any fillers, coloring material and processing aids which may be present.

The pore-forming material used in the preparation of the microporous intermediate layer by the aforementioned techniques must be substantially insoluble in the polyurethane system or in a solution of the polyurethane system, yet must be capable of being extracted from the polyurethane system (in which it has been dispersed) by a liquid in which it is soluble but which does not materially affect (i.e., dissolve) the polyurethane system. To achieve the proper degree of microporosity in the intermediate layer, the pore-forming material should be a fine (not greater than 100 mesh), uniformly small solid which does not change its form during the processing steps involved in the method. For most purposes, even a finer pore-forming material, preferably one which passes through a 325 mesh screen, is desirable. Typical amongst the pore-forming materials which have been used with success are various salts, such as sodium chloride and magnesium sulfate.

The amount of pore-forming material used, of course, is dependent upon the end properties desired in the microporous polyurethane system. For most purposes, we prefer to use from about 1 to about 5 parts by weight of pore-forming material per part by weight of the polyurethane resin. When such concentration of pore-forming material are uniformly dispersed through the polyurethane system and subsesquently leached out with a liquid which dissolves the pore-former but which has no materially adverse effect on the resin, the appearance of a thin film of the resultant microporous polyurethane system under magnifications of from $50\times$ to $100\times$ is that of tiny ellipsoidal (or egg-like) capsules with interconnecting passages. This unusual cellular structure, which is obtained no matter what type of solid pore-forming material is used as long as the solid pore-forming material has an average particle size not larger than 100 mesh, gives the microporous intermediate layer a very soft appearance and "feel" which is highly desirable and which is not marred by the abrasion-resistant outer layer.

The water-resistance of the simulated leather products of the invention is closely related to the hydrophobic characteristics of the polymer, for if the polymer is somewhat hydrophilic because of its chemical structure, then the surface micropores or cells of the microporous intermediate layer are quickly wet and its hydrostatic properties are diminished. This "wetting" is especially pronounced when the simulated leather product is subject to repeated dry cleaning or washing operation, both of which leave a residue of wetting agents.

Because polyurethanes are somewhat hydrophilic by nature, and therefore susceptible to the retention of wetting agents, it has been found desirable to make the micropores (or cells) more hydrophobic for those applications where the simulated leather product is to be subjected to cleaning soaps or other wetting agents. The most practical method of increasing the hydrophobicity of the microporous intermediate layer is to impregnate the product with a solution of a hydrophobic compound, such as a cross-linkable silicone oil. When such hydrophobic compounds are properly applied to the simulated leather products of the invention, it is possible to improve the hydrostatic properties of the intermediate microporomeric structure and, perhaps even more significantly, to retain such improved hydrostatic properties even after repeated washing or dry cleaning with strong wetting agents.

The simulated leather products of the invention are schematically illustrated in the accompanying drawing, which shows (a) The base layer, which is composed of a trimmed, napped fabric in which the fibers forming the nap have trimmed to a substantially uniform length, (b) The microporous intermediate layer, which is composed of a thin, substantially continuous film of a normally solid, microporous polyurethane system having a poromeric structure bonded to the napped surface of the base layer over substantially its entire face in such manner that at least part of the napped fibers extend into and through the microporous intermediate layer, (c) The abrasion-resistant, outer layer, which is composed of a substantially impervious film of a normally solid polyurethane system bonded to the intermediate layer over substantially its entire face in such manner that at least part of the napped fibers which extend through the intermediate layer also extend into and through the outer layer, and (d) The hydrophobic residium, which is optional and which, when present, adheres to the outer layer and remains after impregnation of the fabric and films with a hydrophobic compound, such as a silicone oil.

Simulated leathers produced in accordance with the invention are characterized by water vapor transmission values (as measured by ASTM method E96–53T–B) in the range from about 10 to about 30 grams per hour per square meter. Best results have been obtained when the water vapor transmission values are between about 10 and about 15 grams per hour per square meter. Since the breathability of these simulated leather products is due primarily to those napped fibers which extend into and through both layers of polyurethane coatings, thus providing breathability by capillary action, it is possible to control the water vapor transmission by varying the height and density of the napped fibers which extend from the trimmed napped fabric. Simulated leather products produced in accordance with the invention possess the appearance, including the break and feel, of natural leather and yet may be washed and dry cleaned without marring their appearance.

The following examples are illustrative of the ease with which simulated leather products capable of being washed or dry cleaned and having the break and feel of natural leather may be prepared in accordance with the invention:

Example I

Using a two-roll mill, a polyurethane system was formulated by uniformly blending 37 parts by weight of polyurethane (Estane 5740XI), 0.75 part by weight of cadmium stearate, 5 parts by weight of Catalso clay, and 5 parts by weight of carbon black. The blended polyurethane system was then dissolved in a solvent (such as tetrahydrofuran or dimethyl formamide), 110 parts by weight of 200–400 mesh sodium chloride were added to the solution, and the resultant dispersion coated onto a trimmed, napped cotton sateen. After drying, the salt was leached from the polymer system in a water bath, and the resultant film-coated fabric dried. The weight of the microporous layer was about 1.3 ounces per square yard, based on the area of the fabric. A very thin film (about 0.7 ounce per square yard) of the polyurethane system was then calandered onto the film-coated fabric and the resultant coated fabric was then impregnated with a silicone solution consisting of 100 parts by weight of water, 8 parts by weight of silicone oil (Dow-Corning ET-5317), and 2 parts by weight of a cross-linking catalyst (Catalyst 62), and then dried and cured. The resultant coated napped fabric had the appearance, including the break and feel, of a natural black-colored leather. The water vapor transmission value of this product, as determined by ASTM method E96-53T-B, was found to be about 15 grams per hour per square meter.

Example II

Using the identical technique described in Example I, a thin film of a polyurethane dispersion having the following composition was applied to a trimmed napped cotton fabric.

| Component: | Parts by wt. |
|---|---|
| Polyurethane (Estane 5740XI) | 100.0 |
| Cadmium stearate | 2.0 |
| Clay | 20.0 |
| Carbon black | 2.0 |
| Watching red | 0.7 |
| Blue pigment | 3.0 |
| Phenolic resin | 10.0 |
| 325 mesh NaCl | 500.0 |

After the film-coated fabric was dried, a very thin film of the same polyurethane composition but excluding the sodium chloride was applied to the first coating, and the resultant coated fabric then dried. The salt was then leached from the intermediate polyurethane layer in a water bath, and the coated fabric dried once again, yielding a simulated leather having a water vapor transmission value (as measured by ASTM E96-53T-B) of about 17 grams per hour per square meter. The appearance of the coated fabric was identical to that of natural leather, including the break and feel of natural leather, and yet the coated fabric could be washed or dry cleaned without marring its appearance.

Although the foregoing examples demonstrate the feasibility of producing simulated leathers from trimmed, napped cotton fabrics in accordance with the invention, these simulated leathers may be fabricated from any napped fabric using an intermediate layer of a microporous polymer and an outer layer of an impervious polymer provided that at least part of the napped fibers extend into and through both the intermediate and outer layers so that the water vapor transmission value is not greater than about 30 grams per hour per square meter.

We claim:

1. A simulated leather product capable of being washed or dry cleaned without marring its appearance and having the break and feel of natural leather, consisting essentially of (a) a base layer composed of a trimmed, napped fabric in which the fibers forming the nap have been trimmed to a substantially uniform length, (b) a microporous, intermediate layer composed of from about ¾ to about 2 ounces per yard based on the area of the base layer, of a substantially continuous film of a normally solid, microporous polyurethane system having a poromeric structure bonded to the napped surface of the base layer over substantially its entire face in such manner that at least part of the napped fibers extend into and through the microporous intermediate layer, and (c) an abrasion-resistant, outer layer composed of from about ¼ to about ¾ ounce per yard, based on the area of the base layer, of a substantially impervious film of a normally solid polyurethane system bonded to the intermediate layer over substantially its entire face in such manner that at least part of the napped fibers which extend through the intermediate layer also extend into and through the outer layer, the simulated leather product being characterized by a water vapor transmission value (as measured by ASTM E96-53T-B) not greater than about 30 grams per hour per square meter.

2. A simulated leather product capable of being washed or dry cleaned without marring its appearance and having the break and feel of natural leather, consisting essentially of (a) a base layer composed of a trimmed, napped fabric in which the fibers forming the nap have been trimmed to a substantially uniform length, (b) a microporous, intermediate layer composed of from about ¾ to about 2 ounces per yard, based on the area of the base layer, of a substantially continuous film of a normally solid, microporous polyurethane system having a poromeric structure bonded to the napped surface of the base layer over substantially its entire face in such manner that at least part of the napped fibers extend into and through the microporous intermediate layer, and (c) an abrasion-resistant, outer layer composed of from about ¼ to about ¾ ounce per yard, based on the area of the base layer, of a substantially impervious film of a normally solid polyurethane system bonded to the intermediate layer over substantially its entire face in such manner that at least part of the napped fibers which extend through the intermediate layer also extend into and through the outer layer, the simulated leather product being characterized by a water vapor transmission value (as measured by ASTM E96-53T-B) in the range from about 10 to about 30 grams per hour per square meter.

3. A simulated leather product according to claim 2, in which the water vapor transmission value is in the range from about 10 to about 15 grams per hour per square meter.

4. A simulated leather product according to claim 3, in which the base layer is composed of a trimmed, napped, cotton sateen fabric in which the fibers forming the nap have been trimmed to a substantially uniform length.

5. A simulated leather product capable of being washed or dry cleaned without marring its appearance and having the break and feel of natural leather, consisting essentially of (a) a base layer composed of a trimmed, napped fabric in which the fibers forming the nap have been trimmed to a substantially uniform length, (b) a microporous, intermediate layer composed of from about ¾ to about 2 ounces per yard, based on the area of the base layer, of a substantially continuous film of a normally solid, microporous polyurethane system having a poromeric structure bonded to the napped surface of the base layer over substantially its entire face in such manner that at least part of the napped fibers extend into and through the microporous intermediate layer, (c) an abrasion-resistant, outer layer composed of from about ¼ to about ¾ ounce per yard, based on the area of the base layer, of a substantially impervious film of a normally solid polyurethane system bonded to the intermediate layer over substantially its entire face in such manner that at least part of the napped fibers which extend through the intermediate layer also extend into and through the outer layer, and (d) a hydrophobic residium adhering to the outer layer and remaining after impregnation of the fabric and films with a silicone oil and a cross-linking catalyst for the silicone oil, the simulated leather product being characterized by a water vapor transmission value (as measured by ASTM E96–53T–B) in the range from about 10 to about 30 grams per hour per square meter.

References Cited
UNITED STATES PATENTS

| | | | |
|---|---|---|---|
| 3,284,274 | 11/1966 | Hulslander et al. | 117—135 |
| 3,167,446 | 1/1965 | De Nijs | 117—11 X |
| 1,406,710 | 2/1922 | Wilson | 117—11 X |
| 2,323,269 | 6/1943 | Young et al. | 28—74 |
| 2,588,393 | 3/1952 | Kauppi | 117—161 X |
| 2,597,614 | 5/1952 | Brown et al. | 117—161 X |
| 2,715,074 | 8/1955 | Hirschberger | 117—29 X |
| 2,914,836 | 12/1959 | Montgomery | 28—72 |
| 2,994,110 | 8/1961 | Hardy | 264—112 |
| 3,000,757 | 9/1961 | Johnston et al. | 117—63 |
| 3,085,896 | 4/1963 | Britt et al. | 117—76 X |
| 3,100,721 | 8/1963 | Holden | 117—161 |
| 3,191,258 | 6/1965 | Spencer | 117—11 X |

WILLIAM D. MARTIN, *Primary Examiner.*

R. HUSACK, *Assistant Examiner.*